United States Patent
Hofmann et al.

(10) Patent No.: US 9,133,916 B2
(45) Date of Patent: Sep. 15, 2015

(54) TRACTION-MEANS TENSIONING DEVICE HAVING A SECURING ELEMENT, AND INTERNAL COMBUSTION ENGINE HAVING SUCH A TRACTION-MEANS TENSIONING DEVICE

(75) Inventors: Dominik Hofmann, Bamberg (DE); Peter Tyroller, Adelschlag (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 118 days.

(21) Appl. No.: 13/980,164

(22) PCT Filed: Oct. 28, 2011

(86) PCT No.: PCT/EP2011/068961
§ 371 (c)(1),
(2), (4) Date: Jul. 17, 2013

(87) PCT Pub. No.: WO2012/097889
PCT Pub. Date: Jul. 26, 2012

(65) Prior Publication Data
US 2013/0303318 A1 Nov. 14, 2013

(30) Foreign Application Priority Data
Jan. 17, 2011 (DE) .......................... 10 2011 002 761

(51) Int. Cl.
*F16H 7/22* (2006.01)
*F16H 7/08* (2006.01)

(52) U.S. Cl.
CPC ................ *F16H 7/08* (2013.01); *F16H 7/0836* (2013.01); *F16H 2007/0806* (2013.01); *F16H 2007/0812* (2013.01); *F16H 2007/0859* (2013.01); *F16H 2007/0878* (2013.01)

(58) Field of Classification Search
CPC ................ F16H 2007/0859; F16H 2007/0806; F16H 2007/0812; F16H 7/0848; F16H 2007/0891
USPC .......................................................... 474/110
See application file for complete search history.

(56) References Cited

U.S. PATENT DOCUMENTS

| 4,997,410 A | * | 3/1991 | Polster et al. | .................. 474/110 |
| 5,304,099 A | * | 4/1994 | Deppe et al. | .................. 474/110 |

(Continued)

FOREIGN PATENT DOCUMENTS

| DE | 196 80 418 C1 | 11/2001 |
| DE | 20 2007 012 460 U1 | 1/2009 |

(Continued)

*Primary Examiner* — Henry Liu
(74) *Attorney, Agent, or Firm* — Davidson, Davidson & Kappel, LLC

(57) ABSTRACT

A traction-means tensioning device having a housing that contains aluminum as a material, into which a slide sleeve is inserted axially immovably, within which a hydraulically actuatable, axially extendable piston is supported; a pressure chamber being provided between the piston, which is made of steel, and the slide sleeve, which is made of steel, that can be filled with a hydraulic medium; a securing element engaging on the slide sleeve and the housing to fix the axial position of the slide sleeve relative to the housing, the securing element being provided with an elongate fastening portion that is configured to be fixed in position in the housing and is provided at a housing-distal end with a head that is in form-fitting contact with the slide sleeve. Also, an internal combustion engine having such a traction-means tensioning device and a traction means.

11 Claims, 2 Drawing Sheets

(56) References Cited

U.S. PATENT DOCUMENTS

| | | | | |
|---|---|---|---|---|
| 5,637,047 | A * | 6/1997 | Schulze | 474/110 |
| 5,700,213 | A * | 12/1997 | Simpson et al. | 474/110 |
| 5,860,881 | A * | 1/1999 | Tada | 474/110 |
| 5,879,256 | A * | 3/1999 | Tada | 474/110 |
| 5,935,031 | A * | 8/1999 | Tada | 474/110 |
| 5,967,921 | A * | 10/1999 | Simpson et al. | 474/110 |
| 6,126,563 | A * | 10/2000 | Simpson | 474/110 |
| 6,602,154 | B1 * | 8/2003 | Guichard et al. | 474/110 |
| 2003/0008738 | A1 * | 1/2003 | Rossato et al. | 474/110 |
| 2003/0216202 | A1 * | 11/2003 | Emizu et al. | 474/109 |
| 2004/0092348 | A1 * | 5/2004 | Hashimoto et al. | 474/109 |
| 2004/0092350 | A1 * | 5/2004 | Hashimoto et al. | 474/110 |
| 2006/0063625 | A1 * | 3/2006 | Emizu et al. | 474/110 |
| 2006/0166769 | A1 * | 7/2006 | Yoshida | 474/110 |
| 2007/0287562 | A1 * | 12/2007 | Assel | 474/110 |
| 2008/0020876 | A1 * | 1/2008 | Tanaka | 474/110 |
| 2008/0287232 | A1 * | 11/2008 | Botez et al. | 474/110 |
| 2009/0111628 | A1 * | 4/2009 | Poiret et al. | 474/110 |
| 2009/0197720 | A1 * | 8/2009 | Aurhammer et al. | 474/110 |
| 2010/0105506 | A1 * | 4/2010 | Rointru | 474/110 |
| 2010/0222167 | A1 * | 9/2010 | Chekansky et al. | 474/110 |
| 2011/0081997 | A1 * | 4/2011 | Markely | 474/110 |
| 2013/0260931 | A1 * | 10/2013 | Sato et al. | 474/110 |
| 2013/0303319 | A1 * | 11/2013 | Fischer et al. | 474/110 |

FOREIGN PATENT DOCUMENTS

| | | |
|---|---|---|
| DE | 10 2008 033 260 | 1/2010 |
| JP | 2000 346 152 | 12/2000 |
| WO | WO 2007/122013 | 11/2007 |

* cited by examiner

TRACTION-MEANS TENSIONING DEVICE HAVING A SECURING ELEMENT, AND INTERNAL COMBUSTION ENGINE HAVING SUCH A TRACTION-MEANS TENSIONING DEVICE

The present invention relates to a traction-means tensioning unit having a housing that contains aluminum as a material, into which a slide sleeve is inserted axially immovably, within which a hydraulically actuated, axially extendable piston is supported; a pressure chamber being provided between the piston that is made of steel and the slide sleeve that is made of steel which can be filled with a hydraulic medium; a securing element engaging on the slide sleeve and the housing to fix the axial position of the slide sleeve relative to the housing.

BACKGROUND

Traction-means tensioning devices are used in traction-means drives of internal combustion engines. Such traction-means drives employ either belts, such as toothed belts, or chains, such as timing chains, as traction means. Such traction-means drives are used, in particular, for timing drives of internal combustion engines. Additionally or alternatively, they can also drive other aggregates, such as generators or electric machines.

The traction means are unfortunately subject to an elongation that must be compensated. Temperature-dependent stresses and strains in the traction means must also be compensated.

Traction-means tensioning devices are typically used for this purpose. Such traction-means tensioning devices are also referred to as belt tensioners in connection with the use of belts, and also as chain tensioners in connection with the use of chains.

Depending on the type of actuation, there are different types of traction-means tensioning devices. Thus, inter alia, there are automatic, semi-automatic, mechanical and hydraulic chain tensioners.

Such hydraulic chain tensioners are known, for example, from the German Utility Model Application DE 20 2007 012 460 U1. This publication describes a tensioning unit having a chain tensioner and a shipping brace for locking the tensioning piston.

However, once the tensioning unit is installed, these types of shipping braces can no longer be used.

The German Patent Application DE 10 2008 033 260 A1 describes similar, somewhat improved approaches.

SUMMARY OF THE INVENTION

However, using known methods, it is still difficult, on the one hand, to both secure the sleeve in which the hydraulically extendable piston is supported and, on the other hand, compensate for elongations induced by the different materials selected for the housing, sleeve and piston.

It is, in fact, known to use an alignment pin, respectively tolerance rings to hold the sleeve; the alignment pin or the tolerance rings causing a deformation of the hydraulic element, thus the sleeve, which, however, degrades the performance of the hydraulic element.

There are even significant inherent disadvantages to otherwise customary approaches, such as securing by pressing in place and by bonding.

Thus, the disadvantage of the pressing-in-place approach is that substantial overlapping is required to allow forces to be transferred both at low temperatures, such as −40° C., as well as at high temperatures, such as 150° C. This is due, in particular, to the different expansion coefficients of aluminum and steel.

Bonding is also not without problems since it is likewise expensive, not yet adequately tested, and is prone to contamination during assembly. Also, the bonding itself should be avoided as a contamination source during assembly. Ultimately, therefore, no adequate process reliability is provided.

It is an object of the present invention to secure the slide sleeve to prevent it from moving out axially and, on the other hand, to ensure a pretensioning of the slide sleeve relative to the housing even at different temperatures.

This is achieved in that the securing element is provided with an elongate fastening portion that is configured to be fixed in position in the housing and is provided at a housing-distal end with a head that is in form-fitting contact with the sleeve.

This makes short assembly times possible, the desired pretensioning force being ensured by the resiliently formed head of the securing element. An efficient tolerance compensation is thereby attained. Finally, the securing element is also commercially available as low-cost, mass-produced equipment, reducing the costs of such a traction-means tensioning device.

Advantageous specific embodiments are clarified in greater detail in the following.

Thus, it is advantageous for the securing element to be designed as a pin. Such a pin may be driven into a suitably prepared bore of the housing using simple means, whereby the driving should be carried out only for as long as the pretensioning force provided by the resilient head is not yet sufficient.

When the fastening portion has a toothing, the securing element is prevented from becoming loose from the housing again or even removed.

The securing element is very reliably prevented from becoming loose when the toothing is formed by circumferentially extending grooves which feature a sawtooth-like profile in the longitudinal section.

It is also advantageous when the head has resilient properties, it not only being possible for the head to have resilient properties, but also the entire pin. This makes it possible to compensate for the different temperature expansion coefficients of the various materials.

When the bottom side of the head facing the housing is in contact with a top side of the sleeve facing away from the housing, then an efficient securing may be ensured given a simple assembly.

When the pin is made of steel, and/or the resilient head is made of spring steel, inexpensive materials may be used that are still able to withstand stresses over a long period of time.

It is also advantageous when the securing element is inserted axially immovably in a recess of a thickened region of the housing, the recess being oriented axially parallel to an axis of rotational symmetry of the piston. The housing may then be simply prepared without having to be frequently reclamped during manufacturing.

However, it proves to be particularly advantageous for the head to be configured to be flat and rotationally symmetric relative to the longitudinal axis of the fastening portion, or for the head to extend from the side of the securing element facing away from the axis of rotational symmetry of the piston to the axis of rotational symmetry. This make it possible to prevent the hydraulic element from lifting off, thereby avoiding wear and a dynamic malfunction.

It is advantageous for not just one securing element, but for a plurality of securing elements, which are distributed over the periphery, to be pressed into the aluminum housing at the end face. In such a case, a pin, which is possibly made of steel, holds down the steel housing, thus the slide sleeve, and counteracts the lifting off of the hydraulic element induced by a dynamic characteristic and the supply oil pressure.

The present invention also provides in that an internal combustion engine is combined with a traction-means tensioning device according to the present invention and a traction means. This embodiment employs a press-in part having a toothing and a resilient head piece. When pressed into place, the toothing induces a self-locking in response to axial forces acting on the chain tensioner element, and the resilient head additionally induces a pretensioning force to compensate for the temperature fluctuations of the components. The resilient head also has the advantage of being able to compensate for length tolerances of a chain tensioning element and of the aluminum housing.

BRIEF DESCRIPTION OF THE DRAWINGS

The present invention is elucidated in the following on the basis of exemplary embodiments with the aid of figures, which show.

DETAILED DESCRIPTION

Figure 1:
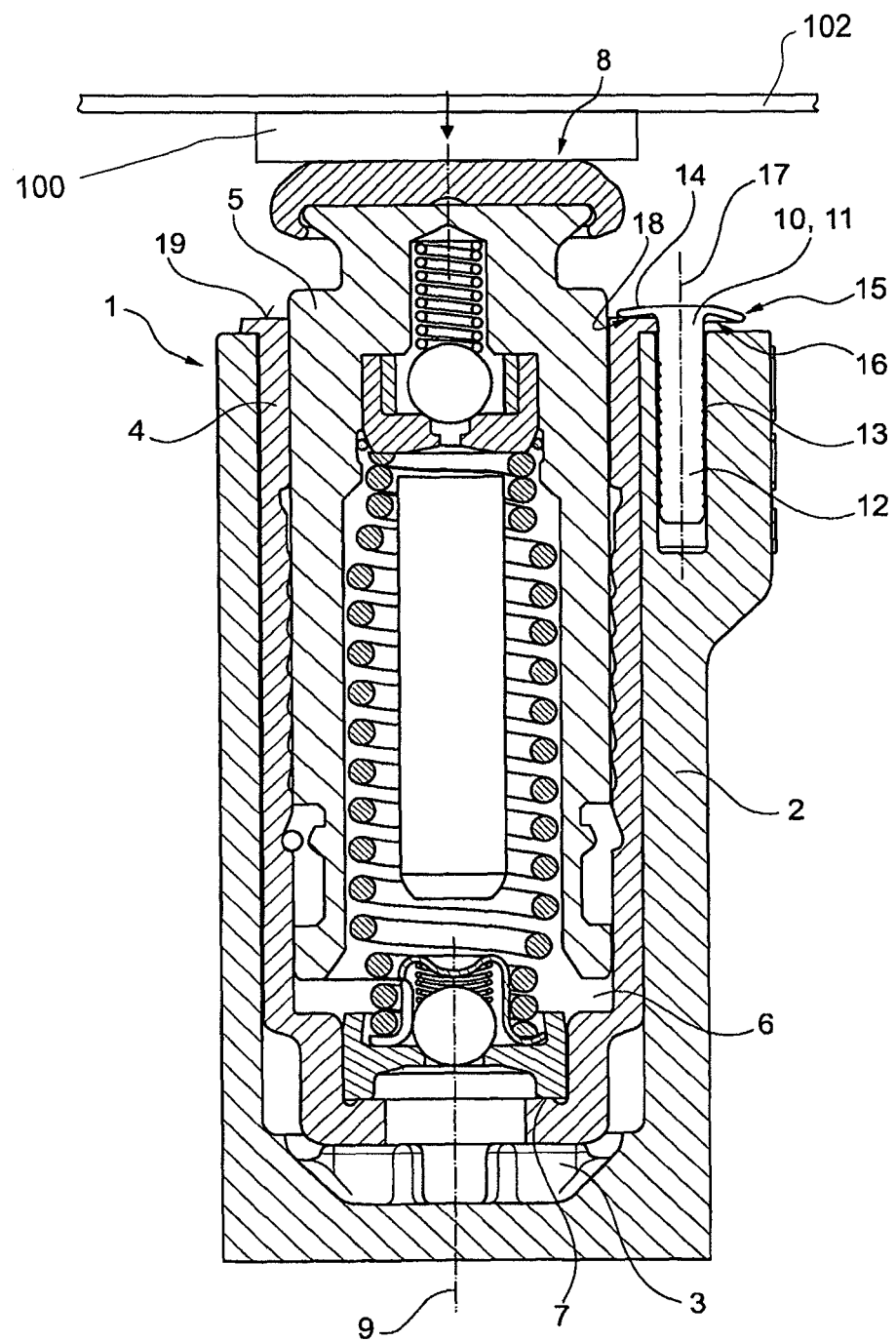
FIG. 1 a longitudinal sectional view through a traction-means tensioning device according to the present invention.

The figures are merely schematic and serve exclusively to further the understanding of the present invention. The elements having essentially equivalent functions are denoted by the same reference numerals.

FIG. 1 shows a section through a traction-means tensioning device 1 according to the present invention.

Traction-means tensioning device 1 has a housing 2. Housing 2 is manufactured from aluminum, respectively an aluminum alloy. Die-cast aluminum, in particular, is used for housing 2.

Housing 2 has a bore 3 which features a substantially cylindrical cross section. A slide sleeve 4 is inserted into bore 3. Slide sleeve 4 is inserted essentially axially immovably in housing 2 and is also configured in bore 3 essentially non-rotatably relative to housing 2. In the interior thereof, slide sleeve 4 has a piston 5 that is slidingly configured to be extendable therefrom. Slide sleeve 4 is manufactured of steel.

Located in the interior of slide sleeve 4 is a pressure chamber 6. This pressure chamber 6 is located between slide sleeve 4 and piston 5 and is sealed in the direction of housing 2 by a non-return valve 7.

In response to opening of non-return valve 7, pressure chamber 6 may be filled with a hydraulic medium, such as oil, in particular engine oil or hydraulic oil. If the pressure prevailing in pressure chamber 6 is greater than pressure F1 pressing on an unattached end 8 of the piston, then piston 5 travels out of slide sleeve 4 and presses on a tensioning rail 100 which deflects a traction means 102, shown schematically.

To ensure that slide sleeve 4, as well, is not slid along an axis 9 of rotational symmetry, a securing element 10 is provided. Securing element 10 is configured as pin 11.

Pin 11 features an elongate fastening portion 12 which, on the outside thereof, has a toothing 13. At the end thereof projecting from housing 2, a head 14 is configured. Head 14 is formed from a resilient material. In particular, entire securing element 10 is made of steel; in the present exemplary embodiment, of spring steel.

Head 14 has a slightly conical outer contour on the top side thereof, as well as on the bottom side thereof. The top side of head 14 is provided with reference numeral 15, whereas the bottom side of head 14 is provided with reference numeral 16. Securing element 10 has a longitudinal axis 17 that is oriented axially parallel to axis 9 of rotational symmetry.

Figure 2:
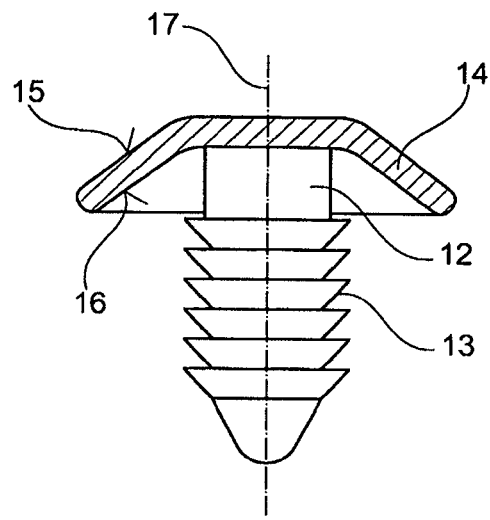
FIG. 2 a separate representation of the securing element in a first specific embodiment.
Figure 3:
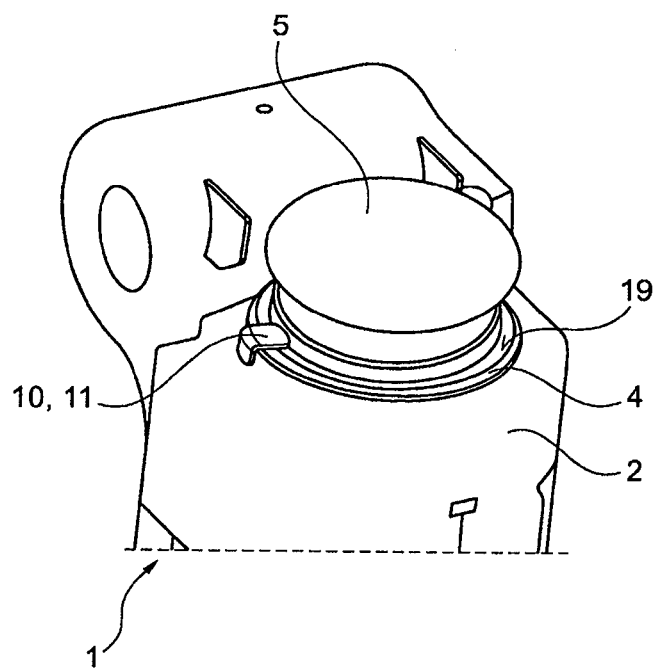
FIG. 3 a perspective representation of a traction-means tensioning device according to the present invention including a second specific embodiment of a securing element.

As is readily discernible from FIG. 2, head 14 is mushroom-shaped. Head 14 rests by a region 18 on bottom side 16 thereof that is as distal as possible from longitudinal axis 17, on top side 19 of slide sleeve 4.

LIST OF REFERENCE NUMERALS 1 traction-means tensioning device
2 housing
3 bore
4 slide sleeve
5 piston
6 pressure chamber
7 non-return valve
8 unattached end
9 axis of rotational symmetry
10 securing element
11 pin
12 fastening portion
13 toothing
14 head
15 top side of the head
16 bottom side of the head
17 longitudinal axis
18 region
19 top side of the slide sleeve

What is claimed is:

1. A traction-means tensioning device comprising:
a housing containing aluminum as a material;
a slide sleeve inserted axially into the housing and fixed axially with respect to the housing;
a hydraulically actuated, axially extendable piston supported in the side sleeve, the piston being made of steel and being slidable along a first longitudinal axis;
a pressure chamber provided between the piston and the slide sleeve and fillable with a hydraulic medium;
a securing element engaging on the slide sleeve and the housing to fix the axial position of the slide sleeve relative to the housing and to center the securing element on a second longitudinal axis radially offset from and parallel to the first longitudinal axis, the securing element being provided with an elongate fastening portion configured to be fixed in position in the housing and provided at a housing-distal end with a head in form-fitting contact with the slide sleeve.

2. The traction-means tensioning device as recited in claim 1 wherein the securing element is configured as a pin.

3. The traction-means tensioning device as recited in claim 1 wherein the fastening portion includes a toothing.

4. The traction-means tensioning device as recited in claim 3 wherein the toothing is formed by circumferentially extending grooves which feature a sawtooth-like profile in the longitudinal section.

5. The traction-means tensioning device as recited in claim 1 wherein the head has resilient properties.

6. The traction-means tensioning device as recited in claim 1 wherein the bottom side of the head facing the housing is in contact with a top side of the sleeve facing away from the housing.

7. The traction-means tensioning device as recited claim 2 wherein the pin is made of steel.

8. The traction-means tensioning device as recited in claim 5 wherein the resilient head is made of spring steel.

9. The traction-means tensioning device as recited in claim 1 wherein the securing element is inserted axially immovably in a recess of a thickened region of the housing, the recess being oriented axially parallel to an axis of rotational symmetry of the piston.

10. The traction-means tensioning device as recited in claim 1 wherein the head is configured to be flat and rotationally symmetric relative to the longitudinal axis of the fastening portion, or the head extends from the side of the securing element facing away from an axis of rotational symmetry of the piston to the axis of rotational symmetry.

11. An internal combustion engine comprising a traction-means tensioning device as recited in claim 1 and a traction means.

\* \* \* \* \*